I. W. LAMB.
Stove Pipe.

No. 92,843.             Patented July 20, 1869.

WITNESSES
Victor Hagmann
Jr. K. Ellsworth

INVENTOR
I. W. Lamb
Munn & Co
att'ys

United States Patent Office.

ISAAC W. LAMB, OF SALEM, MICHIGAN.

Letters Patent No. 92,843, dated July 20, 1869.

STOVE-PIPE FASTENER.

The Schedule referred to in these Letters Patent and making part of the same.

*To all whom it may concern:*

Be it known that I, ISAAC W. LAMB, of Salem, in the county of Washtenaw, and State of Michigan, (post office, Northville, Michigan,) have invented a new and useful Stove-Pipe Fastener, and method of securing stove-pipe therewith; and I hereby declare that the following is such a full, clear, and exact description thereof as will enable others skilled in the art to make and use the same, reference being had to the accompanying drawings, which form a part of this specification, in which—

Similar letters of reference indicate corresponding parts in the several figures.

My invention is designed to be used in the place of rivets for securing the several pieces of stove-pipe together; and It consists, first, in the construction of the pieces, which I term fasteners, in such form as will make them adapted for the purpose; and second, in the manner of attaching the said fasteners to the pipe.

A and B represent two pieces of stove-pipe similar to those in common use, the lower end of the part A, in this case, fitting in the upper end of the part B.

Figure 1:
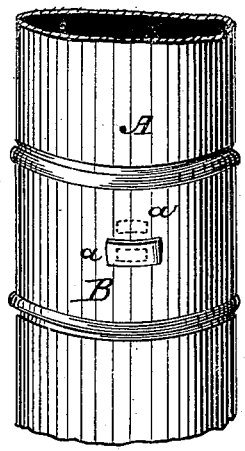
Figure 1 is a perspective view of two sections of pipe fastened together.

In fig. 1, $a$ and $a'$ represent holes cut through the pipe.

The larger end of each piece of pipe has one or more holes cut in it like $a$, while the smaller end has holes like $a'$ cut in it.

When two pieces of pipe are put together, the holes $a$ come over the holes $a'$, and they form an opening of suitable size and form to admit the ports $n$ of the fasteners $m$.

Figure 2:
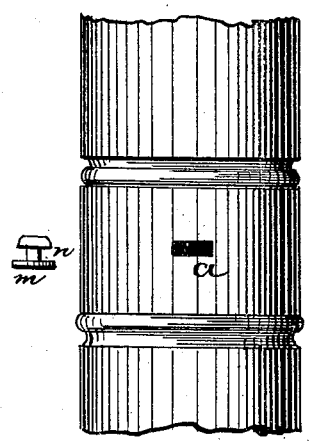
Figure 2 is a front elevation of the same, with the fastener removed.
Figure 3:
Figures 3 and 4 represent the fastener in two different positions.
Figure 4:

The part $n$ of the fasteners is made T-shaped, as seen in fig. 2.

The openings $a\ a'$ are longer one way than the other, the greater length being in a horizontal direction.

The openings $a'$ being on the smaller end of the pipe, I usually make longer than the other, so as to save care in putting the pipe together, but that is not essential.

The manner of using my invention is as follows:

The pipe is constructed in the ordinary manner. Then one or more holes, $a'$, are made near the smaller end of each piece, and also holes $a$ are made near the larger end of each piece.

The pipe is put together in the ordinary manner, and one is pushed into the other until the holes $a$ of one piece come over the holes $a'$ of the other piece.

One of the fasteners is then used for each hole $a'$, the part $n$ being inserted like a key within the holes $a\ a'$.

Figure 5:
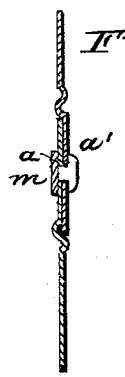

Each fastener is then turned one-fourth of the way round, more or less, as desired, until it assumes the position shown in Figure 5, and securely fastens the pipe together.

When but few pieces of pipe are to be secured together, I only employ two fasteners to each piece, while in other cases, where many pieces of pipe are joined together, I use three or four fasteners to each piece.

I secure the first length of pipe to the stove by the same method, having the fasteners made of suitable length for that purpose.

By this invention, any number of pieces of pipe may be fastened together as securely as though they were riveted, and yet by turning the fasteners one-fourth way round, the said fasteners may be removed and the pipe taken apart wherever desired.

What I claim as my invention, and desire to secure by Letters Patent, is—

Securing the pieces of pipe together by means of the fasteners $m$ entering suitable openings $a\ a'$ made through the pipe, substantially as and for the purpose herein explained.

ISAAC W. LAMB.

Witnesses:
  H. D. BENNETT,
  T. E. JOHNS.